United States Patent
Allen et al.

(10) Patent No.: US 9,652,311 B2
(45) Date of Patent: May 16, 2017

(54) OPTIMIZATION OF NON-VOLATILE MEMORY IN MESSAGE QUEUING

(71) Applicant: International Business Machines Corporation, Armonk, NY (US)

(72) Inventors: Joseph Allen, Belmont, MA (US); Dinakaran Joseph, Apex, NC (US); Gari Singh, Wilmington, MA (US); Meeta Yadav, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 122 days.

(21) Appl. No.: 14/525,458

(22) Filed: Oct. 28, 2014

(65) Prior Publication Data

US 2016/0117242 A1 Apr. 28, 2016

(51) Int. Cl.
 *G06F 9/54* (2006.01)
 *G06F 13/00* (2006.01)
 *G06F 11/14* (2006.01)
 *G06F 13/10* (2006.01)

(52) U.S. Cl.
 CPC ............. *G06F 9/546* (2013.01); *G06F 11/14* (2013.01); *G06F 13/00* (2013.01); *G06F 13/102* (2013.01); *G06F 2212/202* (2013.01)

(58) Field of Classification Search
 CPC ............................ G06F 9/546; G06F 12/0238
 See application file for complete search history.

(56) References Cited

U.S. PATENT DOCUMENTS

| | | | | |
|---|---|---|---|---|
| 2007/0143435 A1* | 6/2007 | Daigle | ................. | G06Q 10/107 709/207 |
| 2009/0222573 A1* | 9/2009 | Grossner | ................. | H04L 47/10 709/235 |
| 2010/0093441 A1* | 4/2010 | Rajaraman | .......... | H04L 67/2823 463/42 |
| 2011/0055471 A1 | 3/2011 | Thatcher et al. | | |
| 2012/0137059 A1* | 5/2012 | Yang | ..................... | G06F 3/0611 711/104 |
| 2013/0124649 A1* | 5/2013 | Triantos | ............... | G06Q 10/103 709/206 |
| 2013/0318288 A1 | 11/2013 | Khan et al. | | |

* cited by examiner

*Primary Examiner* — Edward Dudek, Jr.
(74) *Attorney, Agent, or Firm* — Steven M. Greenberg, Esq.; CRGO Law

(57) ABSTRACT

Embodiments of the invention provide for the optimization of utilization of non-volatile memory in message queuing. In an embodiment of the invention, a method for optimizing utilization of non-volatile memory in message queuing includes receiving a new message in a message queueing system implemented in a host computing system. The method also includes storing the new message as a master message in non-volatile memory of the host computing system. The method yet further includes subsequently receiving different messages that each share redundant information with the master message. The method even yet further includes delta encoding each of the different messages and storing the delta encoded different messages in the non-volatile memory. Finally, the method includes deleting the master message from the non-volatile memory only once each of the different messages and the master message have been acknowledged by at least one consumer subscribing to the message queuing system.

8 Claims, 1 Drawing Sheet

OPTIMIZATION OF NON-VOLATILE MEMORY IN MESSAGE QUEUING

BACKGROUND OF THE INVENTION

Field of the Invention

The present invention relates to message queuing and more particularly to message queuing utilizing non-volatile memory.

Description of the Related Art

In the field of information technology, a message queue is a software-engineering component used for inter-process communications or inter-thread communications. The component employs a queue into which messages can be placed by a messenger and from which messages can be retrieved by a designated recipient. In this regard, the message queue can be a communicative component enabling asynchronous messaging as between the messenger and the designated recipient. Operationally, the message queue can support multiple messengers and recipients such that asynchronous communications can be achieved for a group of participants.

The asynchronous nature of the message queue provides for an ideal technology coupler for disparate technologies. Specifically, so long as separate technologies can access the message queue, the separate and disparate technologies can engage in message passing thereby enabling communications. In particular, the message queue can expose different method calls through an application programming interface (API) for opening, writing to, reading from, and closing the message queue. Each application in turn can include logic to invoke a sequence of the method calls in order to either place a message into the message queue, or to retrieve a message from the message queue. Specifically, in operation, upon request, the API can search a message queue for an available message and can return the same to the requesting logic.

Generally, messages are placed on message queues by one or more applications for the purpose of being processed by other applications. Messages can be processed as the messages arrive on a message queue, or messages can accumulate to be processed at a later time. The message queues themselves can be database structures in fixed storage, for example in space allocated within a hard disk drive. Alternatively, for higher speed performance, message queues can utilize caching in volatile memory. For even greater performance, the database structures can be stored in non-volatile memory such as "FLASH" memory, resulting in substantially fast access to messages in the message queue.

Of note, unlike the massive storage space afforded by fixed storage, non-volatile memory is a limited resource thus restricting the amount of messages that can be persisted in a message queue disposed thereon. To address the possibility that a message queue may become overrun with messages, message queues fail over to storing messages in a database structure in fixed storage. However, in doing so, the performance of the message queue can be greatly affected.

BRIEF SUMMARY OF THE INVENTION

Embodiments of the present invention address deficiencies of the art in respect to message queuing utilizing non-volatile memory and provide a novel and non-obvious method, system and computer program product for the optimization of utilization of non-volatile memory in message queuing. In an embodiment of the invention, a method for optimizing utilization of non-volatile memory in message queuing is provided. The method includes receiving a new message in a message queueing system implemented in a host computing system. The method also includes storing the new message as a master message in non-volatile memory of the host computing system. The method yet further includes subsequently receiving different messages in the message queueing system that each share redundant information with the master message. The method even yet further includes delta encoding each of the different messages and storing the delta encoded different messages in the non-volatile memory. Finally, the method includes deleting the master message from the non-volatile memory only once each of the different messages and the master message have been acknowledged by at least one consumer subscribing to the message queuing system.

In one aspect of the embodiment, the method additionally includes computing a delta ratio for each of the different messages with respect to the master message, detecting a degradation of similarity of the different messages with respect to the master message from the delta ratios, and performing the deleting of the master message from the non-volatile memory only once a threshold amount of degradation is detected and also once each of the different messages and the master message have been acknowledged by at least one consumer subscribing to the message queuing system. In another aspect of the embodiment, the threshold amount of degredation is 50%. In yet another aspect of the embodiment, the message queuing system tracks all delta encoded messages in respect to the master message by keeping a count of each of the delta encoded messages.

In another embodiment of the invention, a message queueing data processing system configured for optimizing utilization of non-volatile memory in message queuing. The system can include a host computing system that includes at least one computer with memory and at least one processor. The memory includes volatile and non-volatile memory. The system also includes a messaging queueing system executing in the memory of the host computing system and a message queue established in the non-volatile memory. Finally, the system includes an optimization module coupled to the messaging queueing system. The module includes program code enabled upon execution in the volatile memory of the host computing system to receive a new message in the message queueing system, to store the new message as a master message in the non-volatile memory, to subsequently receive different messages in the message queueing system that each share redundant information with the master message, to delta encode each of the different messages and to store the delta encoded different messages in the non-volatile memory, and to delete the master message from the non-volatile memory only once each of the different messages and the master message have been acknowledged by at least one consumer subscribing to the message queuing system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for optimizing utilization of non-volatile memory in message queuing. In accordance with an embodiment of the invention, a new message can be received in a message queue. The new message can be determined to not include redundant information relative to other messages in the message queue. As such, the new message can be stored in non-volatile memory as a master message. Thereafter, as other messages are received which are determined to share redundant information with the master message, the other messages can be delta encoded in respect to the master message. As delta encoded messages are acknowledged by consumers of the other messages, the delta encoded messages can be decoded with respect to a corresponding master message and delivered to the consumers. Only once all delta encoded messages of a master message have been acknowledged as well as the master message itself, will the master message be deleted from the non-volatile memory.

Figure 1:
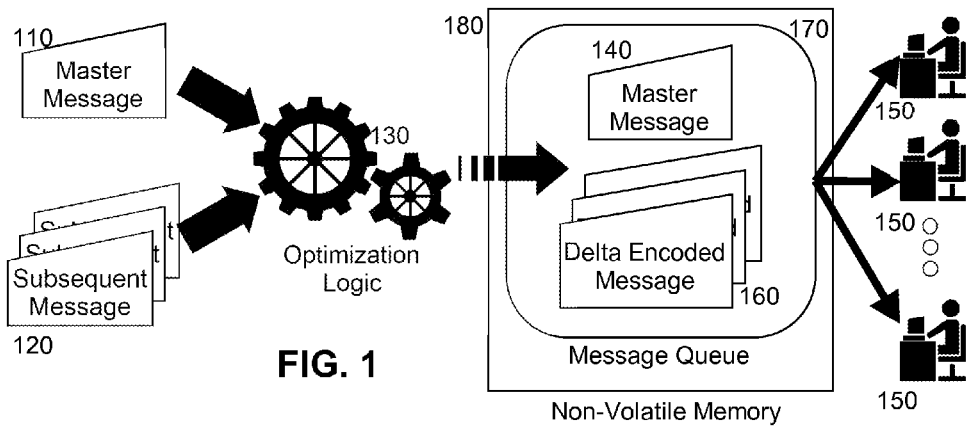
FIG. 1 is a pictorial illustration of a process for optimizing utilization of non-volatile memory in message queuing.

In further illustration, FIG. 1 pictorially shows a process for optimizing utilization of non-volatile memory in message queuing. As shown in FIG. 1, a new message 110 can be received for enqueueing into a message queue 170 defined in non-volatile memory 180 of a message queueing system. Optimization logic 130 can store the new message 110 in the message queue 170 as a master message. Optimization logic 130 can store subsequent messages 120 in the message queue 170 as delta encoded messages 160. Thereafter, the delta encoded messages 160 can be removed from the message queue 170 as message consumers 150 acknowledge the delta encoded messages 160. Further, the optimization logic 130 can remove the master message 140 from the message queue 170 only once all of the delta encoded messages 160 related to the master message 140 have been removed from the message queue 170.

Figure 2:
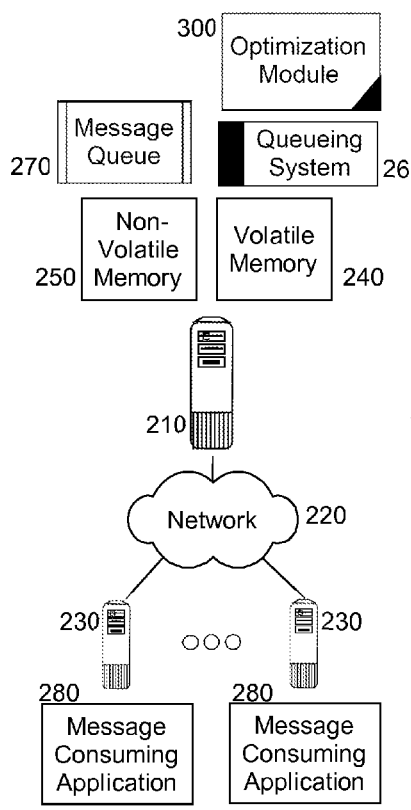
FIG. 2 is a schematic illustration of a message queuing data processing system configured for optimizing utilization of non-volatile memory in message queuing; and, FIG. 3 is a flow chart illustrating a process for optimizing utilization of non-volatile memory in message queuing.

The process described in connection with FIG. 1 can be implemented in a message queuing data processing system. In further illustration, FIG. 2 schematically shows a message queuing data processing system configured for optimizing utilization of non-volatile memory in message queuing. The system can include a host computing system 210 that can include one or more computers with volatile memory 240 and at least one processor (not shown). The host computing system 210 can be communicatively coupled over computer communications network 220 to different client computing systems 230, each supporting a message consuming application 280 executing in a computing device 230. The host computing system 210 can support the operation of a message queueing system 260 executing in the volatile memory 240 of the host computing system 210.

In this regard, the message queueing system 260 can manage the publication and subscription of different messages in a message queue 270 defined in non-volatile memory 250. Of import, an optimization module 300 can be coupled to the message queueing system 260. The optimization module 300 can include computer program instructions that when executed by the processor of the host computing system is enabled to receive a new message for placement in the message queue 270. The new message can be stored in the message queue 270 as a master message. Thereafter, the program instructions can process subsequent messages containing content redundant to the master message.

In respect to subsequent messages containing content that is redundant to the master message, the program instructions can be enabled to delta encode each of the received subsequent messages containing content redundant to the master message and the program instructions can store in the message queue 270 the delta encoded form of the subsequent messages. Optionally, the program instructions can be enabled to monitor the delta ratio of each subsequent message to ensure that the ratio does not fall below a threshold value such as fifty percent (50%) thereby indicating degradation. In order to track the number of delta encoded subsequent messages for a master message, the program instructions can be enabled to implement a counter for each master message that increments whenever a subsequent message containing content redundant to the master message is delta encoded and added to the message queue.

Importantly, the program instructions of the optimization module 300 can be enabled upon execution in the volatile memory 240 of the host computing system 210 to remove each delta encoded message in the message queue 270 once the delta encoded message has been acknowledged by one or more of the message consuming applications. Responsive to the removal of a delta encoded message from the message queue 270, a counter associated with a corresponding master message in the message queue 270 can be decremented. When a counter for a master message reaches zero indicating that no delta encoded messages remain for the master message remain in the message queue 270, and when the master message itself has been acknowledged by one or more of the message consuming applications 280, the master message can be removed from the message queue 270. Optionally, the master message can remain in the message queue 270 unless the delta ratio for the master message has been computed to have fallen below the threshold.

Figure 3:
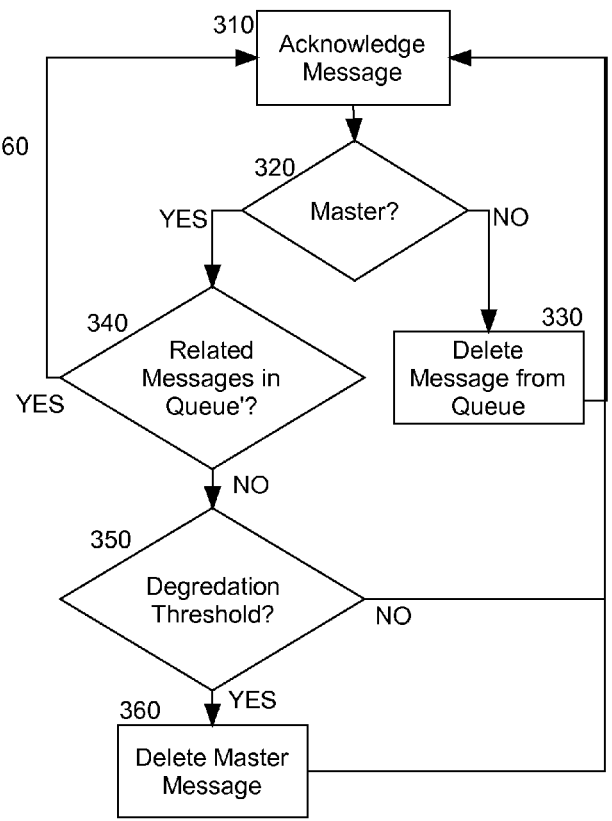

In even yet further illustration of the operation of the optimization module, FIG. 3 is a flow chart illustrating a process for optimizing utilization of non-volatile memory in message queuing. Beginning in block 310, an acknowledgment can be received from a message consumer for a message in the message queue. In decision block 320, it can be determined whether or not the message is a master message. If not, the message, presumably a delta encoded message, can be removed from the message queue. Otherwise, the message being a master message, in decision block 340 it can be determined if related delta encoded messages remain in the message queue. Only if no related delta encoded messages remain in the message queue can the process proceed into decision block 350. In decision block 350, it can be determined if the delta ratio threshold has been breached indicating a degradation of delta encoding. If not, the master message can remain in the message queue. Otherwise, in block 360 the master message can be removed from the message queue.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A message queueing data processing system configured for optimizing utilization of non-volatile memory in message queuing, the system comprising:
a host computing system comprising at least one computer with memory and at least one processor, the memory comprising volatile and non-volatile memory;
a messaging queueing system executing in the memory of the host computing system and a message queue established in the non-volatile memory, the message queue comprising a communicative component enabling asynchronous messaging as between a messenger and a designated recipient component, the messaging queueing system employing the message queue into which messages are placed by the messenger and from which messages can be retrieved by the designated recipient; and,
an optimization module coupled to the messaging queueing system, the module comprising program code enabled upon execution in the volatile memory of the host computing system to receive a new message in the message queueing system, to store the new message as a master message in the non-volatile memory, to subsequently receive different messages in the message queueing system that each share redundant information with the master message, to delta encode each of the different messages and to store the delta encoded different messages in the non-volatile memory, and to delete each delta encoded one of the different messages in response to an acknowledgment by a subscriber consuming the one of the different messages, and then, once all of the delta encoded ones of the different messages have been deleted, to delete the master message from the non-volatile memory only once each of the different messages and the master message has been acknowledged by at least one consumer subscribing to the message queuing system.

2. The system of claim 1, wherein the program code is further enabled to compute a delta ratio for each of the different messages with respect to the master message, to detect a degradation of similarity of the different messages with respect to the master message from the delta ratios and to perform the deleting of the master message from the non-volatile memory only once a threshold amount of degradation is detected and also once each of the different messages and the master message have been acknowledged by at least one consumer subscribing to the message queuing system.

3. The system of claim 2, wherein the threshold amount of degradation is 50%.

4. The system of claim 1, wherein the message queuing system tracks all delta encoded messages in respect to the master message by keeping a count of each of the delta encoded messages.

5. A computer program product for optimizing utilization of non-volatile memory in message queuing, the computer program product comprising a non-transitory computer readable storage medium having program instructions embodied therewith, the program instructions executable by a device to cause the device to perform a method comprising:
receiving by the device a new message in a message queueing system implemented in a host computing system, the messaging queueing system employing a message queue into which messages are placed by a messenger and from which messages can be retrieved by a designated recipient, the message queue comprising a communicative component enabling asynchronous messaging as between the messenger and the designated recipient component;
storing by the device the new message as a master message in non-volatile memory of the host computing system;
subsequently receiving by the device different messages in the message queueing system that each share redundant information with the master message;
delta encoding by the device each of the different messages and storing the delta encoded different messages in the non-volatile memory; and,
deleting by the device each delta encoded one of the different messages in response to an acknowledgment by a subscriber consuming the one of the different messages, and then, once all of the delta encoded ones of the different messages have been deleted, deleting the master message from the non-volatile memory only once each of the different messages and the master message has been acknowledged by at least one consumer subscribing to the message queuing system.

6. The computer program product of claim 5, wherein the method further comprises:
computing a delta ratio for each of the different messages with respect to the master message;
detecting a degradation of similarity of the different messages with respect to the master message from the delta ratios; and,
performing the deleting of the master message from the non-volatile memory only once a threshold amount of degradation is detected and also once each of the different messages and the master message have been acknowledged by at least one consumer subscribing to the message queuing system.

7. The computer program product of claim 6, wherein the threshold amount of degradation is 50%.

8. The computer program product of claim 5, wherein the message queuing system tracks all delta encoded messages in respect to the master message by keeping a count of each of the delta encoded messages.

* * * * *